US012526544B2

(12) United States Patent
Eshel et al.

(10) Patent No.: US 12,526,544 B2
(45) Date of Patent: Jan. 13, 2026

(54) IMAGE SENSOR ASSEMBLY, SOLID-STATE IMAGING DEVICE AND TIME-OF-FLIGHT SENSOR ASSEMBLY

(71) Applicant: Sony Semiconductor Solutions Corporation, Atsugi (JP)

(72) Inventors: Noam Eshel, Stuttgart (DE); Golan Zeituni, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 195 days.

(21) Appl. No.: 18/280,471

(22) PCT Filed: Feb. 17, 2022

(86) PCT No.: PCT/EP2022/053959
§ 371 (c)(1),
(2) Date: Sep. 6, 2023

(87) PCT Pub. No.: WO2022/199952
PCT Pub. Date: Sep. 29, 2022

(65) Prior Publication Data
US 2024/0155259 A1    May 9, 2024

(30) Foreign Application Priority Data
Mar. 24, 2021    (EP) ..................... 21164590

(51) Int. Cl.
*H04N 25/59*    (2023.01)
*G01S 7/4865*    (2020.01)
(Continued)

(52) U.S. Cl.
CPC ........... *H04N 25/59* (2023.01); *G01S 7/4865* (2013.01); *G01S 17/894* (2020.01); *G01S 17/931* (2020.01);
(Continued)

(58) Field of Classification Search
CPC ...... H04N 25/57; H04N 25/59; H04N 25/771; H04N 25/78; H04N 25/79; H10F 39/803; G01S 7/4865; G01S 17/894; G01S 17/931
See application file for complete search history.

(56) References Cited

U.S. PATENT DOCUMENTS 6,963,372 B1 * 11/2005 Hiyama ............... H04N 25/677
                                                   348/E3.018
7,489,355 B2    2/2009 Lee et al.
(Continued)

OTHER PUBLICATIONS

International Search Report and Written Opinion mailed on Jul. 12, 2022, received for PCT Application PCT/EP2022/053959, filed on Feb. 17, 2022, 10 pages.

*Primary Examiner* — Lin Ye
*Assistant Examiner* — Chriss S Yoder, III
(74) *Attorney, Agent, or Firm* — XSENSUS LLP

(57) ABSTRACT

An image sensor assembly includes a pixel circuit including a charge storage structure and an amplification transistor. A load path of the amplification transistor is between an amplifier drain line and a pixel output node. A potential at a storage node of the charge storage structure controls the amplification transistor. An amplifier drain circuit is configured to pass a low potential to the amplifier drain line in a reset period and a high potential in a readout period. A transition from the low potential to the high potential is not before an end of the reset period and prior to a start of the readout period.

20 Claims, 14 Drawing Sheets

(51) Int. Cl.
*G01S 17/894* (2020.01)
*G01S 17/931* (2020.01)
*H04N 25/57* (2023.01)
*H04N 25/771* (2023.01)
*H04N 25/78* (2023.01)
*H04N 25/79* (2023.01)
*H10F 39/00* (2025.01)

(52) U.S. Cl.
CPC ........... *H04N 25/57* (2023.01); *H04N 25/771* (2023.01); *H04N 25/78* (2023.01); *H04N 25/79* (2023.01); *H10F 39/803* (2025.01)

(56) References Cited

U.S. PATENT DOCUMENTS

| | | | |
|---|---|---|---|
| 7,928,484 B2 * | 4/2011 | Hynecek | H10F 39/807 |
| | | | 257/292 |
| 2005/0083421 A1 | 4/2005 | Berezin et al. | |
| 2008/0278612 A1 * | 11/2008 | Egawa | H04N 23/76 |
| | | | 348/E5.041 |
| 2009/0115878 A1 | 5/2009 | Mauritzson | |
| 2009/0236644 A1 | 9/2009 | Adkisson et al. | |
| 2009/0295973 A1 | 12/2009 | Oshikubo et al. | |
| 2015/0130902 A1 * | 5/2015 | Fossum | G06T 7/521 |
| | | | 257/233 |
| 2019/0081095 A1 | 3/2019 | Hanzawa et al. | |
| 2019/0124278 A1 * | 4/2019 | Velichko | H04N 25/583 |

\* cited by examiner

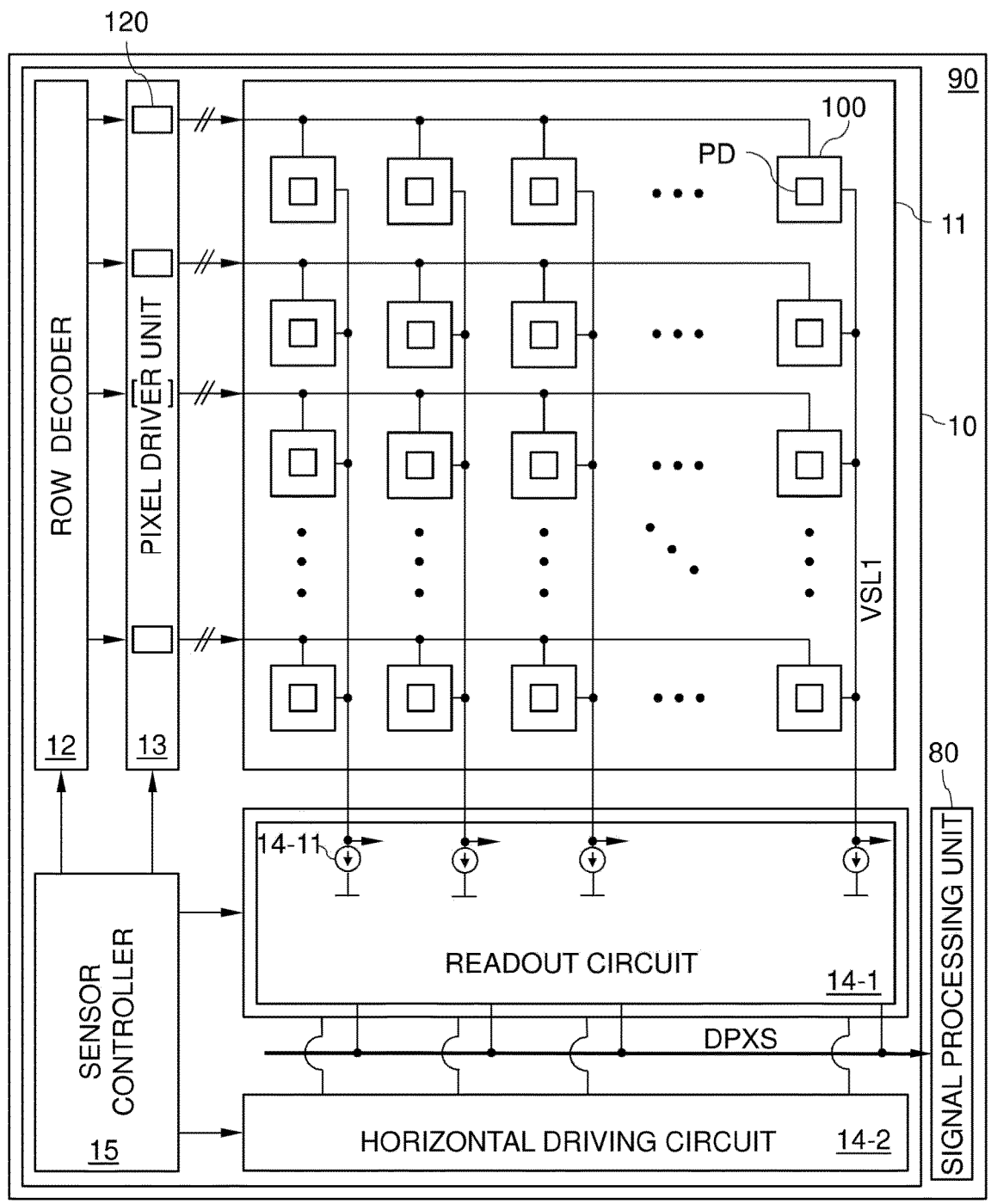

IMAGE SENSOR ASSEMBLY, SOLID-STATE IMAGING DEVICE AND TIME-OF-FLIGHT SENSOR ASSEMBLY

CROSS-REFERENCE TO RELATED APPLICATIONS

The present application is based on PCT filing PCT/EP2022/053959, filed Feb. 17, 2022, which claims priority from European Patent Application No. 21164590.8, filed Mar. 24, 2021, the entire contents of each are incorporated herein by reference.

The present disclosure relates to an image sensor assembly, to a solid-state imaging device, and to a time-of-flight sensor. More specifically, the disclosure relates to image sensor assemblies with pixel circuits for intensity readout.

BACKGROUND

Image sensors in solid-state imaging devices include photoelectric conversion elements generating a photocurrent with a current rating in proportion to the received radiation intensity. A pixel circuit transforms the small photocurrent generated by the photoelectric conversion element into a comparatively large output voltage which a downstream analog-to-digital converter converts into a digital signal. A pixel circuit for intensity readout typically includes a pixel capacitance that integrates the photocurrent during an exposure period and the pixel circuit outputs a voltage proportional to the voltage dropping across the pixel capacitance at the end of the exposure period as the pixel output signal. The pixel capacitance determines crucial characteristics of the image sensor like sensitivity, dynamic range and noise performance.

SUMMARY

Today, there is an ongoing need for solid-state imaging devices that cover a wide dynamic range for exposure radiation and/or facilitate fast image capturing. The present disclosure has been made in view of the above circumstances, and it is therefore desirable to provide a pixel circuit and a solid-state imaging device combining wide light sensitivity range, high image capturing rates, and high noise performance.

According to an embodiment, an image sensor assembly includes a pixel circuit that includes a charge storage structure and an amplification transistor. A load path of the amplification transistor is between an amplifier drain line and a pixel output node. The pixel circuit is configured such that a potential at a storage node of the charge storage structure controls the amplification transistor. The image sensor assembly further includes an amplifier drain circuit configured to pass a low potential to the amplifier drain line in a reset period and a high potential in a readout period. A transition from the low potential to the high potential is not before an end of the reset period and prior to a start of the readout period.

According to another embodiment, a solid-state imaging device includes a pixel array unit with a plurality of pixel circuits. Each pixel circuit includes a charge storage structure and an amplification transistor. A load path of the amplification transistor is between an amplifier drain line and a pixel output node. The pixel circuit is configured such that a potential at a storage node of the charge storage structure controls the amplification transistor. Each pixel circuit further includes a reset circuit configured to pass a reset potential to the storage node for the reset period, wherein the reset circuit includes a reset transistor with a load path connected to a reset potential and further includes an intervening transistor with a load path connected in series between the load path of the reset transistor and the storage node. The solid-state imaging device further includes an amplifier drain circuit configured to pass a low potential to the amplifier drain line in a reset period and a high potential in a readout period.

The solid-state imaging device may further include a sensor controller configured to generate a control signal and to pass the control signal to the amplifier drain circuit, wherein the amplifier drain circuit is configured to control the potential on the amplifier drain line in response to the control signal such that a transition from the low potential to the high potential at the amplifier drain line is not before an end of the reset period and prior to a start of the readout period.

According to a further embodiment, a time-of-flight sensor assembly includes a pixel array unit including a plurality of pixel circuits, wherein each pixel circuit includes a charge storage structure and an amplification transistor with a load path between an amplifier drain line and a pixel output node. The pixel circuit is configured such that a potential at a storage node of the charge storage structure controls the amplification transistor. The pixel circuit further includes a supplemental charge storage structure and a supplemental amplification transistor with a load path between the amplifier drain line and a supplemental pixel output node, wherein the pixel circuit is configured such that a voltage across the supplemental charge storage structure controls the supplemental amplification transistor. The time-of-flight sensor assembly further includes an amplifier drain circuit configured to pass a low potential to the amplifier drain line in a reset period and a high potential in a readout period.

For example, a transition from the low potential to the high potential at the amplifier drain line is not before an end of the reset period and prior to a start of the readout period.

The described embodiments, together with further advantages, will be best understood by reference to the following detailed description taken in conjunction with the accompanying drawings.

BRIEF DESCRIPTION OF THE DRAWINGS

FIG. 1 is a simplified block diagram illustrating a solid-state imaging device with an image sensor assembly according to an embodiment of the present technology.

DETAILED DESCRIPTION

Figure 2A:
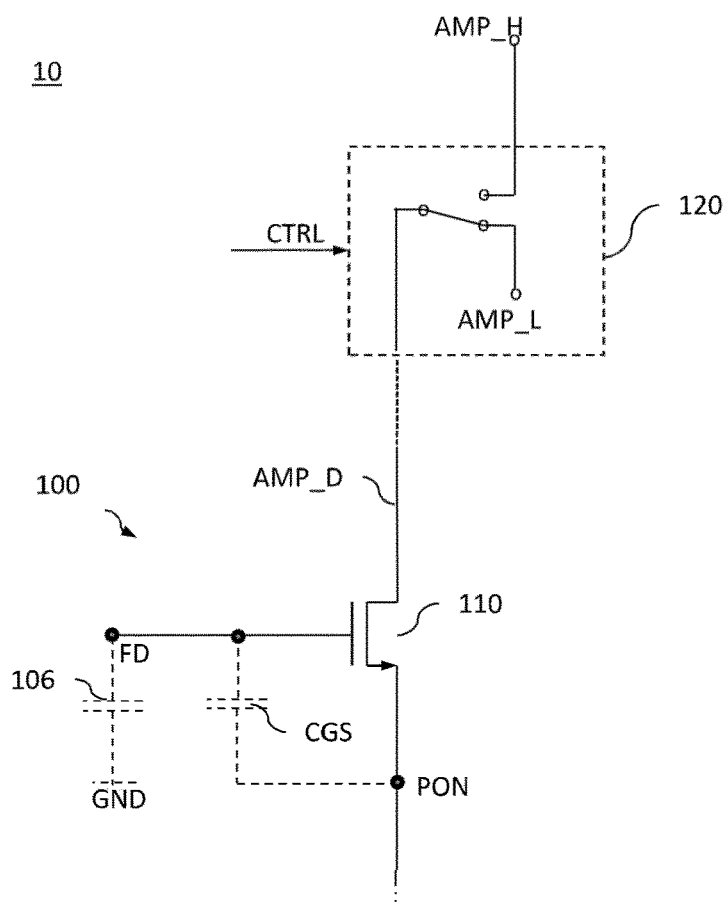
FIGS. 2A and 2B include a simplified circuit diagram and a simplified time chart for illustrating a configuration example of an image sensor assembly implementing a voltage boost at the storage node according to an embodiment.

Embodiments for implementing techniques of the present disclosure (also referred to as "embodiments" in the following) will be described below in detail using the drawings. The techniques of the present disclosure are not limited to the embodiments, and various numerical values and the like in the embodiments are illustrative. In the following description, the same elements or elements with the same functions are denoted by the same reference signs, and duplicate descriptions are omitted.

Electrically connected electronic elements may be electrically connected through a direct, permanent low-resistive connection, e.g., through a conductive line. The term "electrically connected" may also include a connection through other electronic elements provided and suitable for permanent and/or temporary signal transmission and/or transmission of energy. For example, electronic elements may also be electrically connected through electronic switches such as transistors or transistor circuits, e.g. MOSFETs, transmission gates, and others.

The load path of a transistor is the controlled path of a transistor. For example, a voltage applied to a gate of a field effect transistor (FET) controls by field effect the current flow through the load path between source and drain.

Though in the following a technology for increasing the dynamic range of pixel circuits of solid-state imaging devices are described in the context of certain types of active image sensors for intensity read-out, the technology may also be used for other types of active image sensors.

FIG. 1 illustrates a configuration example of a solid-state imaging device 90 including an image sensor assembly 10 and a signal processing unit 80 according to an embodiment of the present technology.

The image sensor assembly 10 may include a pixel array unit 11, a row decoder 12, a pixel driver unit 13, a column signal processing unit including a readout circuit 14-1 and a horizontal driving circuit 14-2, and a sensor controller 15.

The pixel array unit 11 includes a plurality of pixel circuits 100. Each pixel circuit 100 includes a photoelectric conversion element PD and a number of FETs (field effect transistors) for controlling the signal output by the photoelectric conversion element PD. The pixel circuits 100 may be any active pixel sensors adapted for at least intensity readout.

The pixel array unit 11 may be a one-dimensional pixel array with the photoelectric conversion elements PD of all active pixel circuits 100 arranged along a straight or meandering line (line sensor) in a semiconducting pixel substrate. In particular, the pixel array unit 11 may be a two-dimensional array, wherein the photoelectric conversion elements PDs of the pixel circuits 100 may be arranged along straight or meandering rows and along straight or meandering lines in a horizontal plane of a pixel substrate.

The pixel circuits 100 may be connected along columns and along rows. A subset of pixel circuits 100 assigned to the same row form a pixel row. The pixel circuits 100 of the same pixel row may share common control lines and may be addressed synchronously. A subset of pixel circuits 100 assigned to the same column form a pixel column. The pixel circuits 100 of the same pixel column share at least one common data signal line (vertical signal line) VSL. The pixel output signals of the pixel circuits 100 of the same pixel column are successively passed to a data signal line VSL per a time division multiplexing method.

The row decoder 12 and the pixel driver unit 13 control driving of each pixel circuit 100 of the pixel array unit 11. In particular, the row decoder 12 may supply a control signal for designating the pixel circuit 100 or the pixel row to be controlled to the pixel driver unit 13 according to an address signal from the sensor controller 15. The pixel driver unit 13 may drive the FETs of the pixel circuit 100 according to driver timing signals supplied from the sensor controller 15 and the control signals supplied from the row decoder 12. The row decoder 12 or the pixel driver unit 13 may include one or more amplifier drain circuits 120 as described in detail in the following figures.

The output signals of the pixel circuits 100 (pixel output signals) are passed through the data signal lines VSL to the readout circuit 14-1 of the column signal processing unit.

For pixel circuits 100 implementing intensity readout, the readout circuit 14-1 may include one or more ADCs (analog-to-digital converters). The readout circuit 14-1 may include as much ADCs as the pixel array unit 11 includes data signal lines VSL or pixel columns. Alternatively, the number of ADCs may be lower than the number of pixel columns, wherein each ADC may be multiplexed between two or more of the data signal lines VSLs. Each ADC performs an analog-to-digital conversion on the pixel output signals successively read out from the respective pixel column. To this purpose, each ADC may include a comparator, a digital-to-analog converter (DAC) and a counter to convert each pixel output signal into digital pixel data DPXS.

The horizontal driving circuit 14-2 may control the elements of the readout circuit 14-1 to pass the pixel data DPXS to the signal processing unit 80. For pixel circuits 100 implementing event detection in addition to the intensity readout, the readout circuit 14-1 may include further circuits, e.g. latches, registers, or other type of memory elements for temporarily storing event data.

The sensor controller 15 controls the other components of the image sensor assembly 10. For example, the sensor controller 15 may supply the address to the row decoder 12 and may supply the driving timing signals to the pixel driver unit 13. In addition, the sensor controller 15 may supply one or more control signals for controlling the column signal processing unit, e.g. the ADCs in the readout circuit 14-1 and the horizontal driving circuit 14-2.

Details of the pixel circuits 100 and the amplifier drain circuits 120 are described with reference to the following figures.

FIG. 2A illustrates components of an image sensor assembly 10 including a pixel circuit 100 that includes a charge storage structure 106 and an amplification transistor 110 with a load path between an amplifier drain line AMP_D and a pixel output node PON. A potential at a storage node FD of the charge storage structure 106 controls the amplification transistor 110. The image sensor assembly 10 further includes an amplifier drain circuit 120 that passes a low potential to the amplifier drain line AMP_D in a reset period Tres and that passes a high potential to the amplifier drain line AMP_D in a readout period Trdout.

Figure 2B:
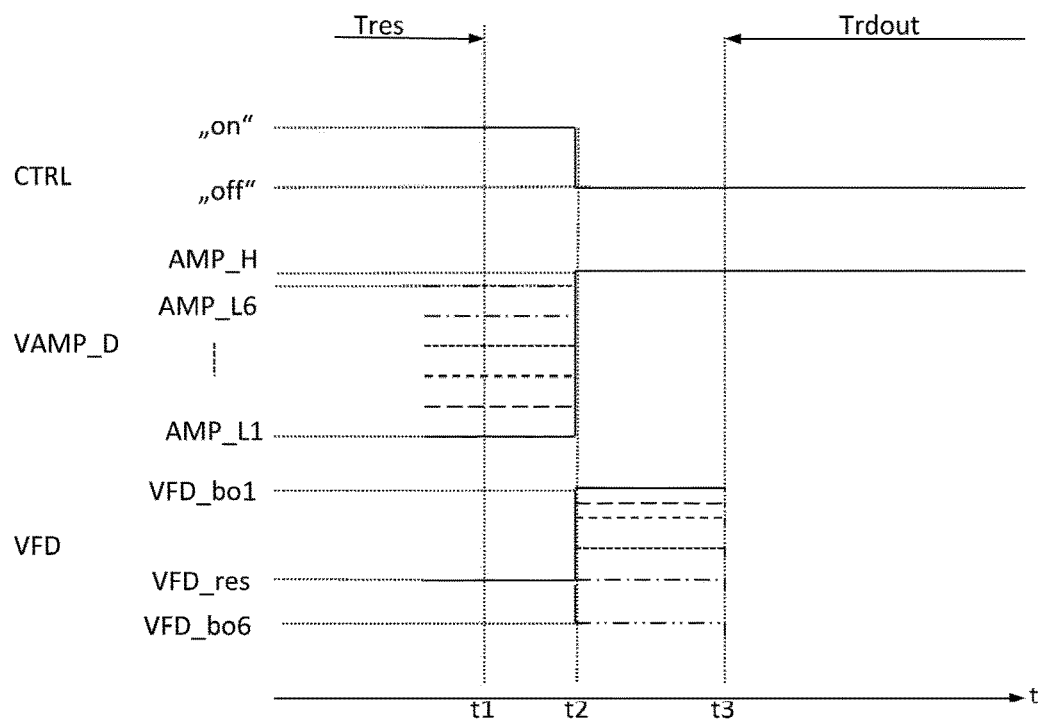

As illustrated in FIG. 2B a transition from the low potential to the high potential is not before, e.g., after an end of the reset period Tres and prior to a start of the readout period Trdout.

The amplifier drain circuit 120 may be formed as part of the row decoder 12 or as part of the pixel driver unit 13 as illustrated in FIG. 1. For example, the image sensor assembly 10 may include one amplifier drain circuit 120 per pixel row, wherein the reset is rolling and active for one pixel row at a time. According to another example, the image sensor assembly 10 may include one single amplifier drain circuit 120 connected to all pixel circuits 100, wherein the reset may effective for all pixel circuits 100 at the same time.

The charge storage structure 106 may be or may include a capacitive structure formed at least in parts in a semiconducting pixel substrate. For example, at least a storage node (storage electrode) of the charge storage structure 106 may include a floating diffusion region in the pixel substrate. A reference node (reference electrode) of the charge storage structure 106 may be another doped region or a metallic structure directly connected to a supply reference potential GND. Alternatively or in addition, the charge storage structure 106 may predominantly include a parasitic capacitance formed by connection lines capacitively coupled to the supply reference potential GND and/or input capacitances of FETs.

The amplification transistor 110 may include an n-channel FET (nFET), wherein the semiconducting path between drain and source forms the load path. The amplification transistor 110 may be connected in a source follower configuration between the amplifier drain line AMP_D and a current control circuit, wherein the current control circuit may supply a constant current to the source of the amplification transistor 110 in a readout period. The storage node FD may be directly connected to a gate of the amplification transistor 110 in an integration period, such that at least in the integration period the potential of the storage node FD controls the amplification transistor 110.

During the reset period Ties, a high potential is passed/supplied to the storage node FD of the charge storage structure 106, wherein the storage node FD is pre-charged to a FD reset voltage VFD_res. Outside the reset period Tres, the storage node FD may be "floating" or may be connected to a detector current source, wherein the charge storage structure 106 integrates the detector current passed by the detector current source to the storage node FD.

During the readout period Trdout, the pixel output node PON is electrically connected to a data signal line and the pixel circuit 100 passes a pixel output signal to a data signal line, wherein a voltage level of the pixel output signal is proportional to the integrated charge on the storage node FD. Outside the readout period Trdout, the pixel output node PON is decoupled from the data signal line and is only capacitively coupled with the gate and drain of the amplification transistor 110.

The charge storage structure 106 serves as temporary local charge storage and may be discharged by the detector current in an integration period. The integration period may follow the reset period Tres directly or after a waiting period. The higher an initial voltage across the charge storage structure 106 is at the beginning of the integration period, the higher is the dynamic range of the pixel circuit 100. Current injection through transistors that switch off at the end or after the reset period Tres may discharge the storage node FD to some degree prior to the beginning of the integration period, may in this way decrease the initial voltage at the storage node FD at the beginning of the integration period and may therefore narrow the dynamic range of the pixel circuit 100.

The amplifier drain circuit 120 in FIG. 2A uses capacitive switching to increase the initial voltage by an offset voltage, wherein the offset voltage depends on the capacitance of the charge storage structure 106 and on the potential difference between the high potential and the low potential passed by the amplifier drain circuit 120 to the amplifier drain line AMP_D.

The amplifier drain circuit 120 may include one or more switches, e.g. two auxiliary FETs, wherein a first auxiliary FET switches the amplifier drain line AMP_D to the high potential AMP_H, and wherein a second auxiliary FET switches the amplifier drain line AMP_D to the low potential AMP_L.

The amplifier drain circuit 120 may be controllable by a digital control signal CTRL. For example, the first and second auxiliary FETs are alternatingly turned on and off in response to a level change of the control signal CTRL between an "on" state for passing/supplying the low potential AMP_L to the amplifier drain line AMP_D and an "off" state for passing/supplying the high potential AMP_L to the amplifier drain line AMP_D.

The control signal CTRL may be generated by the sensor controller 15 of FIG. 1 and may be passed from the sensor controller 15 to the amplifier drain circuit 120 of one pixel row.

According to FIG. 2B, the voltage VFD across the charge storage structure 106 is set to the FD reset voltage VFD_res prior to the end of the reset period which ends at t=t1. Also prior to the end of the reset period at t=t1, the amplifier drain circuit 120 is set to pass a low potential AMP_L1, . . . AMP_L6 to the amplifier drain line AMP_D.

At t=t2 in a time period that follows the reset period and that precedes the next readout period Trdout, the amplifier drain circuit 120 switches to passing/supplying the high potential AMP_H to the amplifier drain line AMP_D. Provided that the pixel output node PON is decoupled from the data signal line, by capacitive coupling the voltage step at the amplifier drain line AMP_D transforms into a voltage increase at the gate of the amplification transistor 110 by an offset voltage, which adds to the FD reset voltage VFD_res. This FD voltage boost increases the saturation charge of the storage node and improves charge transfer efficiency from the photoelectric conversion element PD to the storage node FD.

In this way the amplifier drain circuit 120 can be used to increase the initial voltage at the storage node FD prior to the readout period Trdout. For example, a decrease of the FD reset voltage VFD_res due to current injection may be at least partly compensated, completely compensated or even overcompensated to some degree.

FIG. 2B further shows the dependence of the offset voltage and the voltage at the storage node FD after t=t2 from the potential difference between the low potential AMP_L1, . . . AMP_L6 and the high potential AMP_H. With the low potential increasing from AMP_L1 to AMP_L6, the difference between the high potential AMP_H and the respective low potential decreases and the voltage VFD across the charge storage structure 106 after t=t2 decreases from VFD_bo1 to VFD_bo6.

A difference between the high potential and the low potential is selected as a function of the ratio between the capacitance of the floating diffusion and the gate capacitance of the amplification transistor. For example, a difference between the high potential and the low potential may be at most 30% of the high potential.

The amplifier drain circuit 120 facilitates increasing the dynamic range of the pixel circuit 100 without significantly increasing noise. The amplifier drain circuit 120 may have a significant effect on the dynamic range in particular when the capacitance of the charge storage structure 106 is comparatively small.

For example, the capacitance of the charge storage structure 106 may be at most 4fF.

The capacitance of the charge storage structure may be sufficiently low and the difference between the high potential AMP_H and the low potential AMP_L sufficiently high such that after the transition from the low potential AMP_L to the high potential AMP_H at the amplifier drain line AMP_D, the potential at the storage node FD is not lower than at the end of the reset period Ties. In particular, the potential at the storage node FD is not lower than at the end of the reset period Tres after the transition from the low potential AMP_L to the high potential AMP_H and at or prior to the beginning of the integration period. Otherwise, the integrated charge can reduce the potential at the storage node FD.

For example, after the transition from the low potential AMP_L to the high potential AMP_H at the amplifier drain line AMP_D, the initial voltage Vbo at the storage node FD may exceed the reset voltage VFD_res by about 10% of the reset voltage VFD_res.

In addition, the capacitance of the charge storage structure 106 may be sufficiently high and the difference between the high potential and the low potential sufficiently low such that after transition of the amplifier drain line AMP_D from the low potential to the high potential the amplification transistor 110 the amplification transistor operates in the same region (linear region or saturation region) as it operates without voltage boots. For example, the difference between the high potential and the low potential is sufficiently low such that after transition of the amplifier drain line AMP_D from the low potential to the high potential the amplification transistor 110 is not operated in the linear region but kept in saturation such that the voltage boost does not adversely affect the transfer characteristic of a source follower circuit which includes the amplification transistor 110 as component.

Figure 3A:
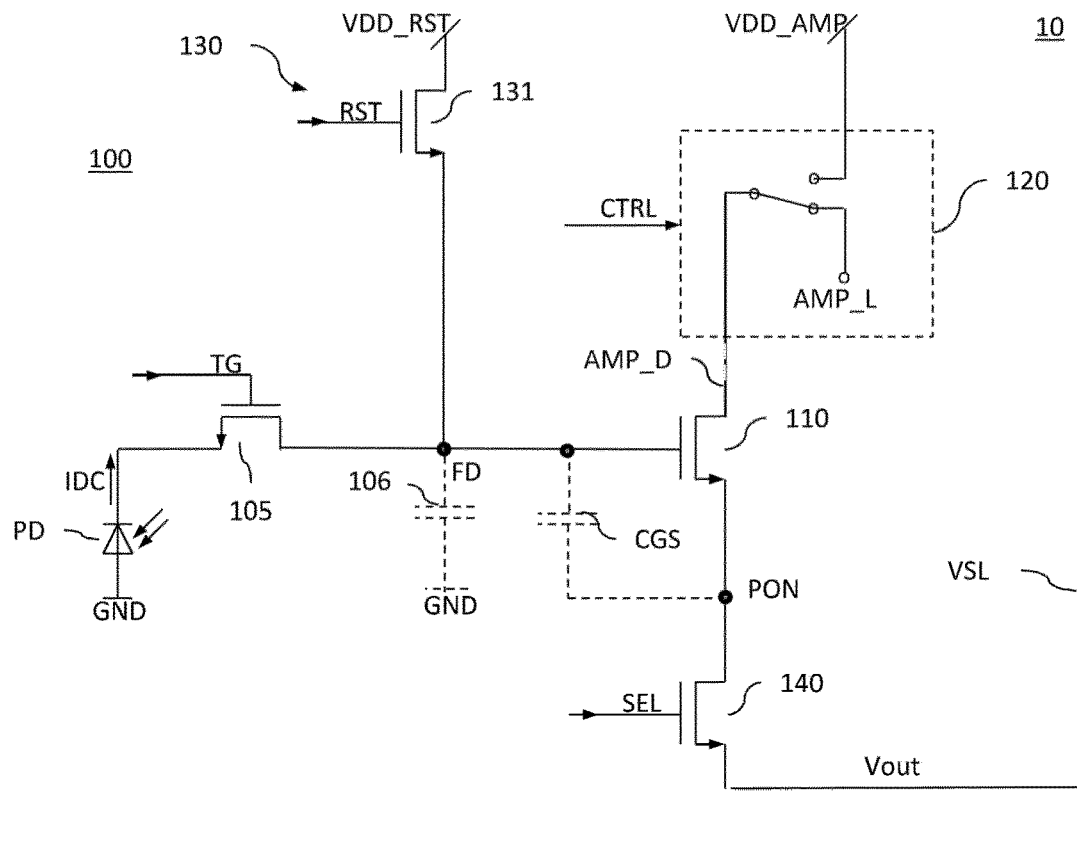
FIGS. 3A and 3B include a simplified circuit diagram and a simplified time chart for illustrating a configuration example of an image sensor assembly with a pixel circuit according to an embodiment with the pixel circuit including a photoelectric conversion element, a reset circuit and a selection transistor.

FIG. 3A shows a pixel circuit 100 with a photoelectric conversion element PD, a transfer transistor 105, the amplification transistor 110, a reset circuit 130, and a selection transistor 140 as active elements.

In particular, the pixel circuit 100 may include a photoelectric conversion element PD that generates a detector current signal IDC. The detector current signal may discharge the storage node FD of the charge storage structure 106 during an integration period.

The photoelectric conversion element PD may include or may be composed of a photodiode that converts by photo effect incident electromagnetic radiation impinging onto a detection area into electric charges (here, electrons). The amount of electric charge generated in the photoelectric conversion element PD corresponds to the amount of the incident electromagnetic radiation.

A load path of the transfer transistor 105 may be connected between the photoelectric conversion element PD and the storage node FD. The transfer transistor 105 may an nFET and serves as transfer element for transferring charge from the photoelectric conversion element PD to the storage node FD. A transfer signal TG may be passed to the gate of the transfer transistor 105 to control exposure time and the length of the integration period.

The integration period may follow the reset period Tres and the boost period or may overlap with the boost period. The integration period may precede a readout period Trdout, may overlap with a readout period Trdout or may be identical with a readout period.

The reset circuit 130 may pass/supply a reset potential VDD_RST to the storage node FD of the charge storage structure 106 for the reset period Tres. In other words, an on-state of the reset circuit 130 defines the reset period Tres. The reset period Tres starts with the reset circuit 130 turning on and ends with the reset circuit 130 turning off.

According to the illustrated example, the reset circuit 130 may include one single reset transistor 131, which may be an nFET, by way of example. Alternatively, the reset circuit 130 may include two or more transistors, e.g. two FETs electrically connected in series between the reset potential VDD_RST and the storage node FD.

For example, the reset potential VDD_RST may be equal to a positive pixel supply voltage VDD and the reset circuit 130 may be connected to a supply line that supplies the positive supply voltage VDD to circuit elements of the solid-state imaging device. At least a reset signal RST may be passed to an input of the reset circuit 130 and controls the reset circuit 130. For example, the reset signal RST may be passed to the gate of the reset transistor 131 and controls the reset transistor 131. Thus, the reset transistor 131 serving as a reset element resets a potential of the storage node FD of the charge storage structure 106 to approximately the positive supply voltage VDD.

The storage node FD of the charge storage structure 106 is connected to the gate of the amplification transistor 110 serving as an amplification element. The storage node FD of the charge storage structure 106 functions as the input node of the amplification transistor 110.

Further, the pixel circuit 100 may include a selection transistor 140 that passes the pixel output signal Vout at the pixel output node PON to a data signal line VSL for the readout period Trdout.

In other words, an on-state of the selection transistor 140 defines the readout period Trdout. The readout period Trdout starts with the selection transistor 140 turning on and ends with the selection transistor 140 turning off. The amplification transistor 110 and the selection transistor 140 are connected in series between the amplifier drain circuit 120 and the data signal line VSL.

Thus, the amplification transistor 110 is connected to the data signal line VSL through the selection transistor 140. The amplification transistor 110 and a current control circuit 14-11, which is formed as part of the readout circuit 14-1 shown in FIG. 1 and which may be configured as constant current source, complement each other to a source follower circuit passing the pixel output signal Vout to the column signal processing unit.

When a selection signal SEL corresponding to an address signal is passed to the gate of the selection transistor 140, the selection transistor 140 turns on for the readout period Trdout. When the selection transistor 140 is turned on, the amplification transistor 110 amplifies the potential of the storage node FD of the charge storage structure 106 and outputs a voltage Vout corresponding to the potential of the storage node FD to the data signal line VSL. The voltage Vout represents the pixel output signal. The data signal line VSL transfers the pixel output signal from the pixel circuit 100 to the readout circuit 14-1 in FIG. 1

Since the respective gates of the transfer transistor 105, the reset transistor 131, and the selection transistor 140 may be connected in units of pixel rows, the operations described above may be simultaneously performed for each of the pixel circuits 100 assigned to the same pixel row.

Figure 3B:
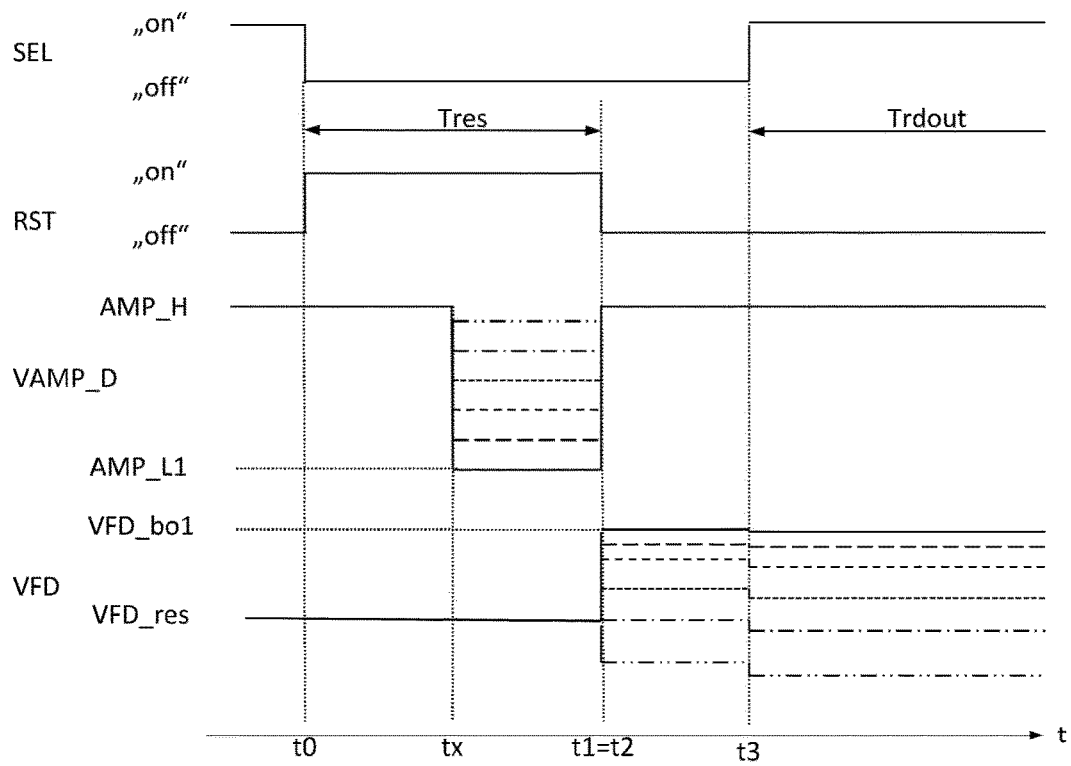

As illustrated in FIG. 3B the reset period Tres starts with the reset signal RST changing from "off" to "on" and turning on the reset transistor 131 at t=t0. The selection signal SEL is also "off" at least in the final part of the reset period Tres and may change from "on" to "off" prior to t=t0, at t=0 or after t=t0. For example, in a global shutter case the selection signal SEL may be "off" throughout at least the complete reset period Tres. When the selection signal SEL is "off", the pixel output node PON is decoupled from the data signal line VSL.

For example, the selection transistor 140 may turn off prior to a transition from the high potential AMP_H to the low potential AMP_L on the amplifier drain line AMP_D at t=tx or later.

The reset period Tres ends with the reset signal RST changing from "on" to "off" at t=t1. At the same time, the voltage VAMP_D at the amplifier drain line AMP_D may change from the low potential AMP_Ln to the high potential AMP_H.

Capacitive coupling between drain and gate of the amplification transistor 110 boosts the voltage VFD at the storage node FD at t=t1. At the same time, charge injection from the desaturating reset transistor 131 tends to decrease the voltage VFD at the storage node FD at t=t1. Depending on the difference between the low potential AMP_L and the high potential AMP_H, switching of the amplifier drain circuit 120 may partially compensate the voltage drop caused by charge injection, may compensate the voltage drop or even overcompensate the voltage drop caused by charge injection. When at t=t3 the readout period Trdout starts with the selection signal SEL changing to "on", the switching of the selection transistor 140 may induce an additional voltage drop. On the other hand, the FD voltage boost provides a higher initial voltage at the storage node FD for the integration period. After t=t3, the voltage VFD at the storage node FD can be higher than it was without the FD voltage boost.

Figure 4:
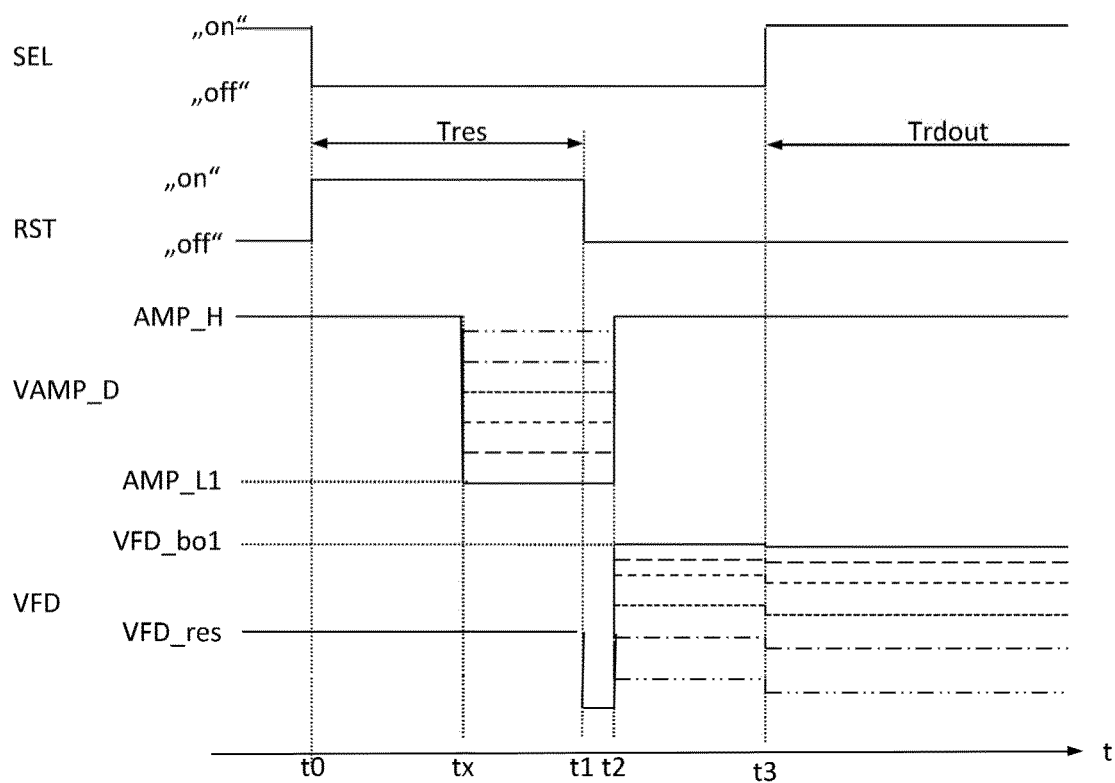
FIG. 4 shows a further simplified time chart referring to a further configuration example of an image sensor assembly with a pixel circuit according to an embodiment with the pixel circuit including a photoelectric conversion element, a reset circuit and a selection transistor.

In FIG. 4 the voltage VAMP_D at the amplifier drain line AMP_D may change from the low potential AMP_L to the high potential AMP_H at t=t2 after the end of the reset period Tres. The voltage VFD at the storage node FD drops at t=t1 due to charge injection from the desaturating reset transistor 131. At t=t2 switching the amplifier drain circuit 120 to the high potential AMP_H boosts the voltage VFD at the storage node FD.

Figure 5A:
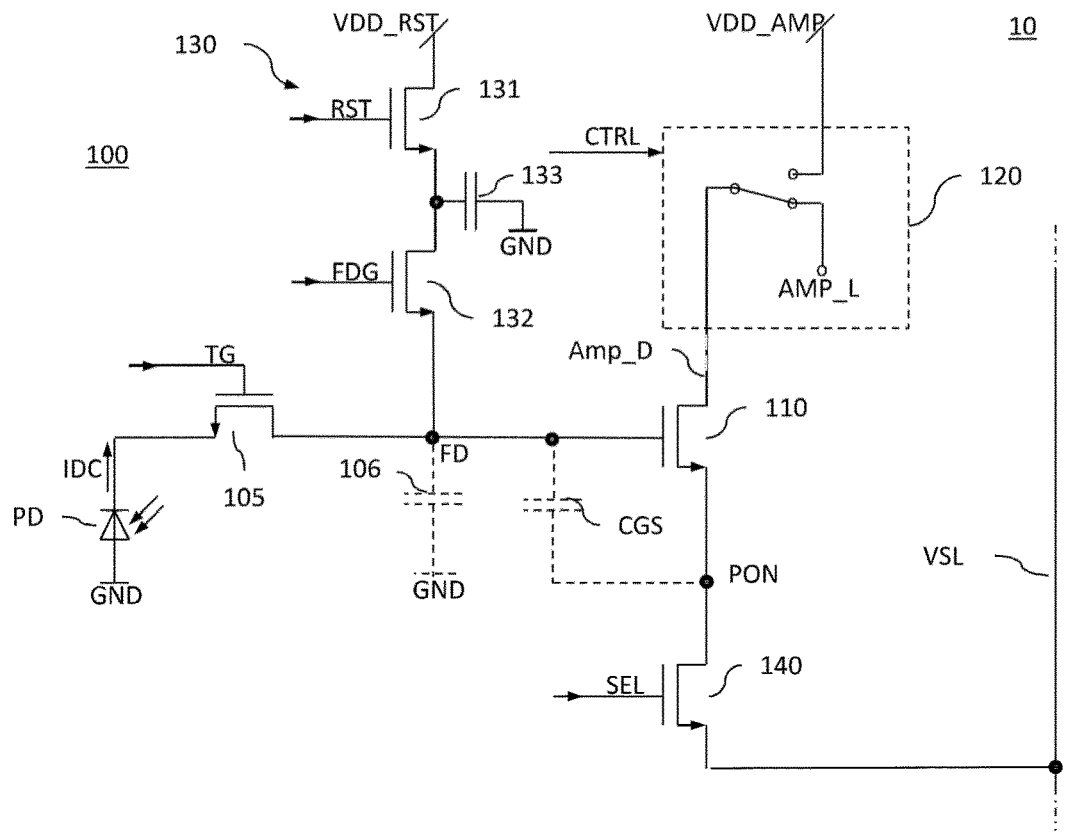
FIGS. 5A to 5C include a simplified circuit diagram and two simplified time charts for illustrating configuration examples of an image sensor assembly with a pixel circuit according to an embodiment with the pixel circuit including a reset circuit with a reset transistor and an intervening transistor.

FIG. 5A shows a pixel circuit 100 with a reset circuit 130 that includes a reset transistor 131 and an intervening transistor 132. A load path of the reset transistor 131 is connected to a reset potential VDD_RST. The intervening transistor 132 has a load path connected in series between the load path of the reset transistor 131 and the storage node FD. The pixel circuit 100 is configured such that the transition on the amplifier drain line AMP_D from low potential AMP_L to high potential AMP_H is not before, e.g. after, the intervening transistor 132 turns off.

The reset transistor 131 and the intervening transistor 132 may be nFETs. A supplementary capacitive structure 133 may be effective between the network node connecting the source of the reset transistor 131 and the drain of the intervening transistor 132. The supplementary charge storage structure 133 may include at least the parasitic capacitance of the network node between the reset transistor 131 and the intervening transistor 132. A capacitance control signal FDG passed to the gate of the intervening transistor 132 controls the intervening transistor 132. A reset signal RST passed to the gate of the reset transistor 131 controls the reset transistor 131.

When the capacitance control signal FDG turns on the intervening transistor 132, the capacitance of the supplementary charge storage structure 133 adds to the capacitance of the charge storage structure 106. A comparatively high amount of charge can be discharged by the detector current signal such that even under bright illumination conditions the total capacitance is not completely discharged during the exposure period and the dynamic range is high. On the other hand, sensitivity under dark illumination conditions is low.

When the capacitance control signal FDG turns off the intervening transistor 132, the supplementary charge storage structure 133 is decoupled from the charge storage structure 106. Even a small detector current signal may result in a comparatively high voltage signal swing at the pixel output node PON under dark illumination conditions. On the other hand, the comparatively small capacitance of the charge storage structure 106 alone may be completely discharged before the end of the exposure period under bright illumination conditions such that the dynamic range is low.

By combining the transition of the voltage VAMP_D on the amplifier drain line AMP_D from low potential AMP_L to high potential AMP_H to the turn-off of the intervening transistor 132, the FD voltage boost is effective for the low illumination operation mode which uses a small integration capacitance.

Figure 5B:
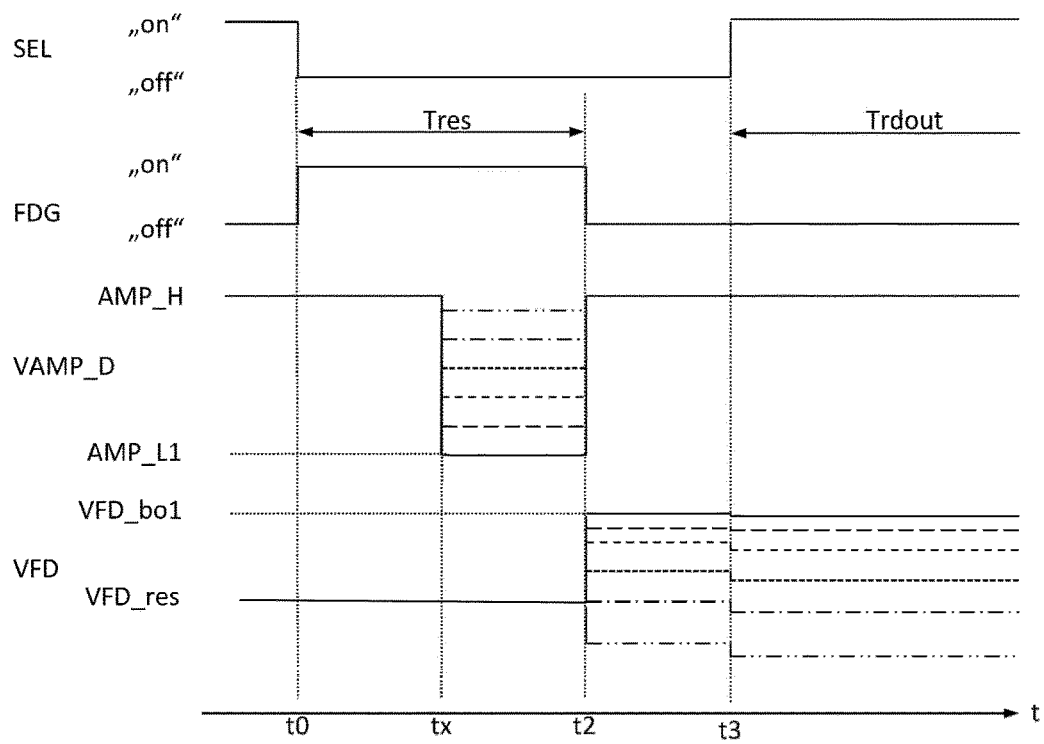

In the example shown in FIG. 5B the capacitance control signal FDG switches from "on" to "off" at t=t2 at the same time the voltage VAMP_D on the amplifier drain line AMP_D changes from the low potential AMP_L to the high potential AMP_H or earlier. Turning off the intervening transistor 132 may also coincide with the end of the reset period for the low illumination operation mode.

Figure 5C:
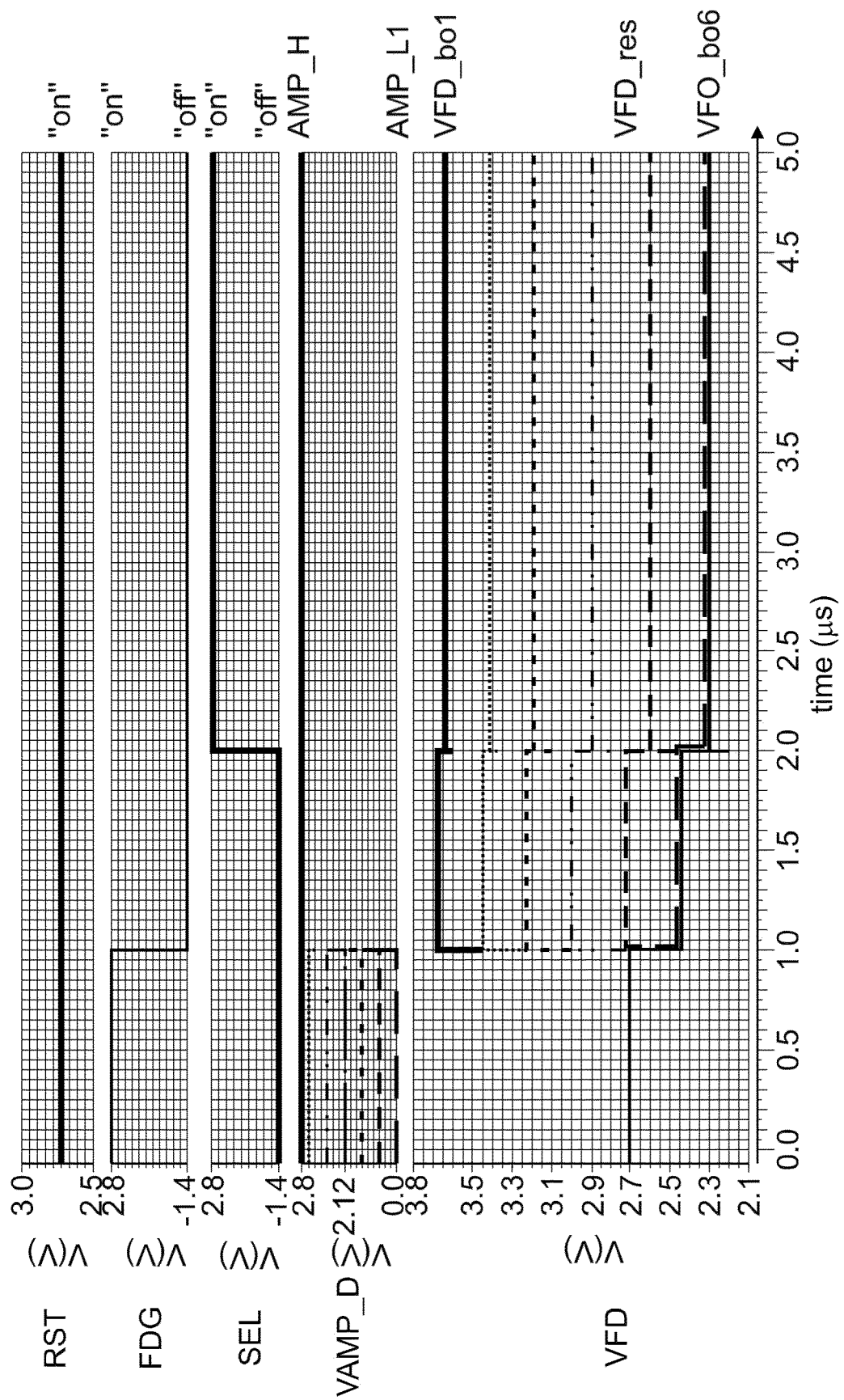

In FIG. 5C the reset signal RST is "on" for the illustrated period.

Figure 6:
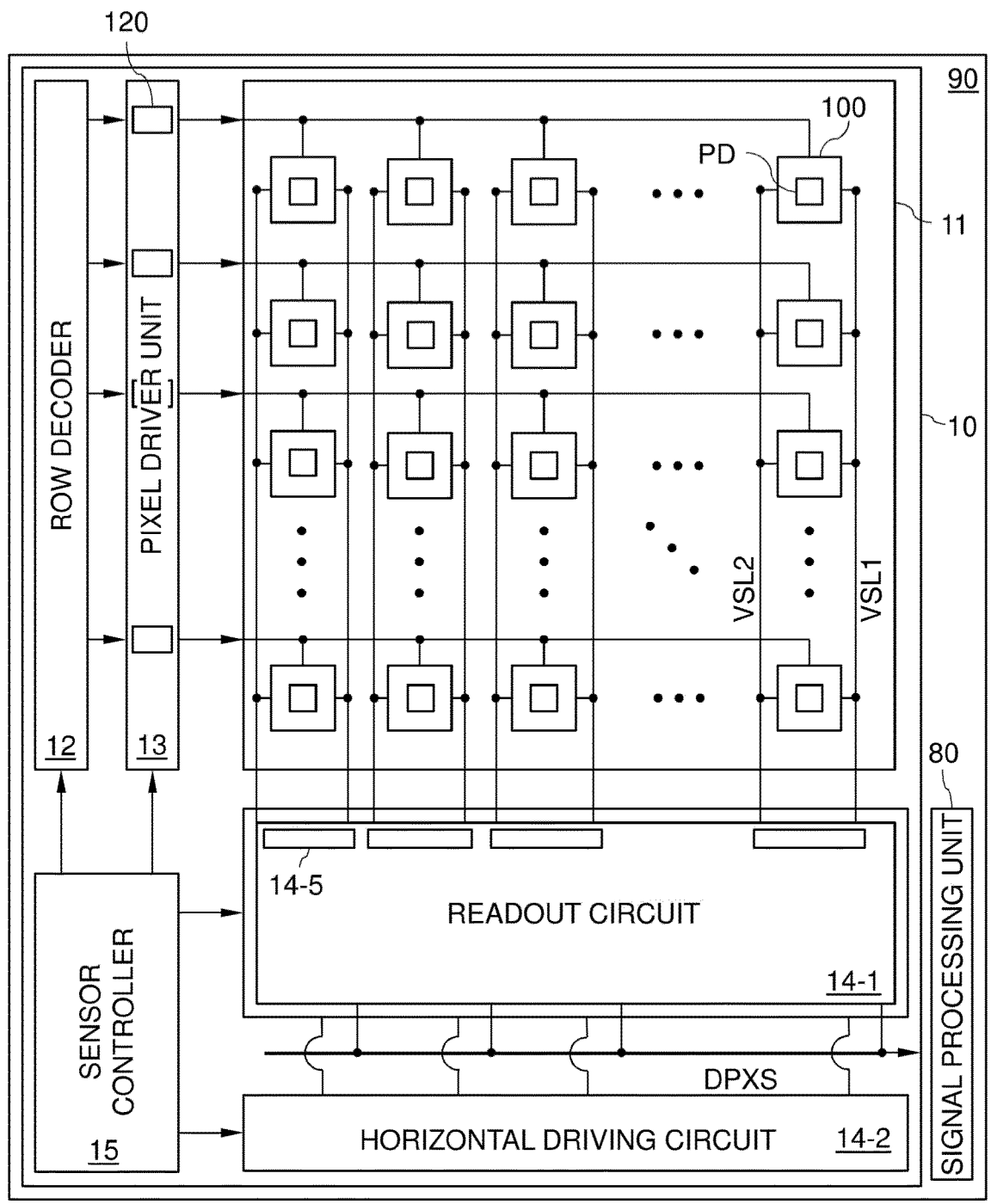
FIG. 6 is a simplified block diagram illustrating a solid-state imaging device according to an embodiment concerning pixel columns connected to two data signal lines.

FIG. 6 shows a solid-state imaging device configured as time-of-flight image sensor. Each pixel circuit 100 generates two different pixel output signals, wherein the two pixel output signals may be generated in close temporal connection with each other. For example, the time-of-flight image sensor may include a radiation source for illuminating a scene and the exposure of the photoelectric conversion element PD of the pixel circuits may be synchronized with the radiation source. In particular, a first one of the pixel output signals may be generated with the radiation source being inactive and the second one of the pixel output signals may be generated with the radiation source active immediately after or directly before the first one of the pixel output signals.

The pixel circuits 100 of a pixel column pass the first ones of the pixel output signals to a first data signal line VSL1 and pass the second ones of the pixel output signal to a second data signal line VSL2. The readout circuit 14-1 of the column signal processing unit may include time-of-flight circuits 14-5. Each time-of-flight circuit 14-5 may combine corresponding first and second pixel output signals from each pixel circuit 100 and may excerpt image information relevant for distance estimation. For example, the time-of-flight circuits 14-5 may suppress image information based on ambient light.

Figure 7:
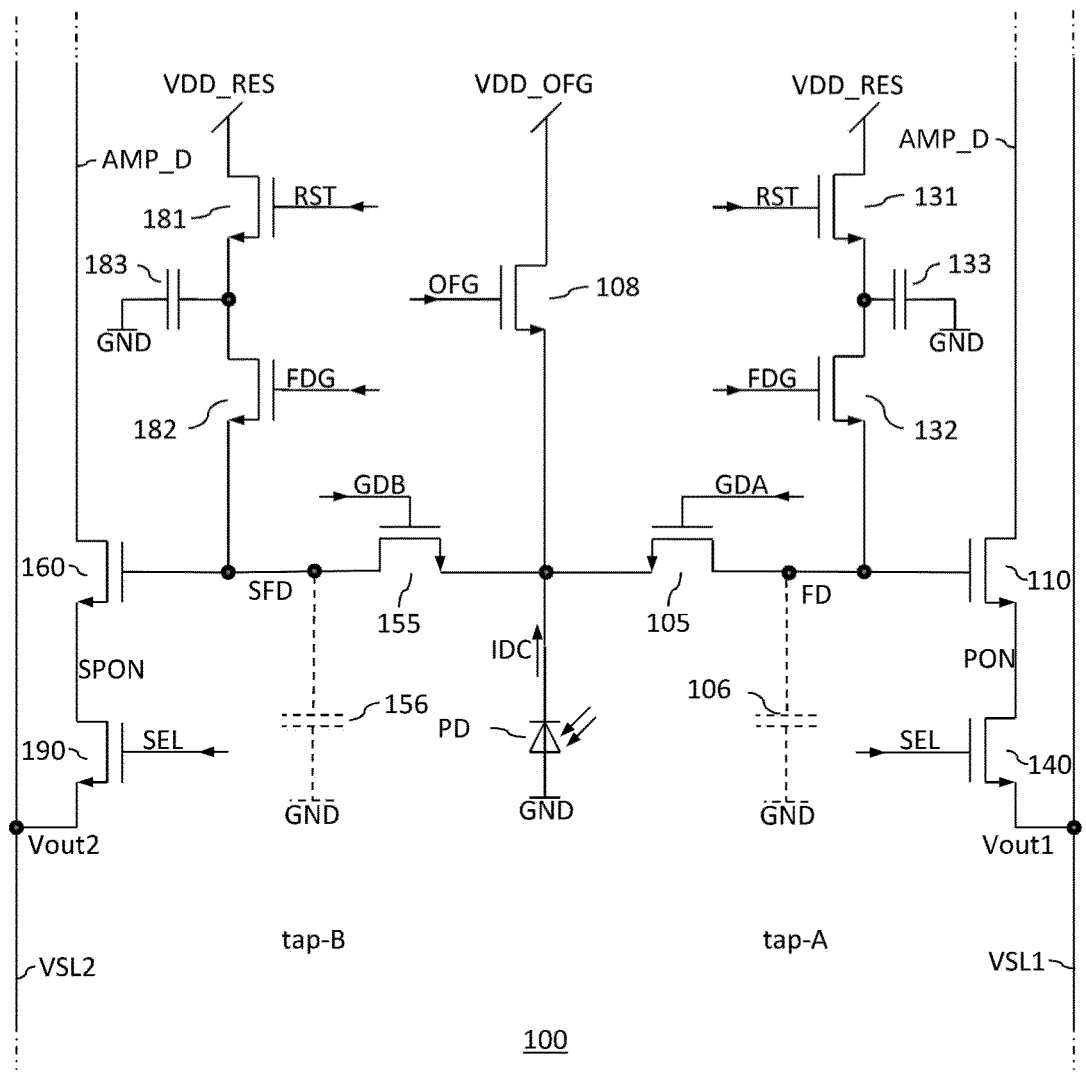
FIG. 7 is a simplified circuit diagram for illustrating a configuration example of a pixel circuit according to an embodiment concerning an image sensor assembly with two data signal lines per pixel column.

FIG. 7 shows a pixel circuit 100 of the solid-state imaging device of FIG. 6 in more detail.

In addition to the components of the pixel circuit 100 in FIG. 5A, the pixel circuit 100 includes a supplemental charge storage structure 156 and a supplemental amplification transistor 160 with a load path between the amplifier drain line AMP_D and a supplemental pixel output node SPON, wherein a potential at a supplemental storage node SFD of the supplemental charge storage structure 156 controls the supplemental amplification transistor 160.

The charge storage structure 106 and the supplemental charge storage structure 156 may have the same capacitance. Accordingly, the amplification transistor 110 and the supplemental amplification transistor 160 may have the same physical dimensions and the same electrical parameters. The drains of the amplification transistor 110 and the supplemental amplification transistor 160 may be directly connected to each other.

The charge storage structure 106 and the amplification transistor 110 form part of a tap-A part of the pixel circuit 100 passing a first pixel output signal Vout1 to a first data signal line VSL1. The supplemental charge storage structure 156 and the supplemental amplification transistor 160 form part of a tap-B part of the pixel circuit 110 passing a second pixel output signal Vout2 to a second data signal line VSL2. The tap-A part and the tap-B part may use a common photoelectric conversion element PD, e.g. in a time-divided readout process.

FIG. 7 refers to an example with the tap-A part including all further transistors of the pixel circuit 100 of FIG. 5A and with the tap-B part including a supplemental transfer transistor 155, a supplemental intervening transistor 182, a supplemental reset transistor 181, and a supplemental selection transistor 190.

The transfer transistor 105 and the supplemental transfer transistor 155 may have the same physical dimensions and the same electrical parameters, wherein a first transfer signal GDA controls the transfer transistor 105 of the tap-A part and a second transfer signal GDB controls the supplemental transfer transistor 155 of the tap-B part.

The reset transistor 131 and the supplemental reset transistor 181 may have the same physical dimensions and the same electrical parameters. A common reset signal RST controls both the reset transistor 131 of the tap-A part and the supplemental reset transistor 181 of the tap-B part. The intervening transistor 132 and the supplemental intervening transistor 182 may have the same physical dimensions and the same electrical parameters. A common capacitance control signal FDG controls both the intervening transistor 132 of the tap-A part and the supplemental intervening transistor 182 of the tap-B part.

The selection transistor 140 and the supplemental selection transistor 190 may have the same physical dimensions and the same electrical parameters. A common selection signal SEL may control both the selection transistor 140 of the tap-A part and the supplemental selection transistor 190 of the tap-B part.

In addition to the photoelectric conversion element PD, the tap-A part and the tap-B part may share a common shutter transistor 108, which may be an nFET. A shutter control signal OFG may control the common shutter transistor 108. A drain of the common shutter transistor 108 may be electrically connected to a high potential VDD_OFG, which may be electrically connected to the drain line VDD_RES of the reset transistors 131, 181 or to the amplifier drain line AMP_D.

Figure 8:
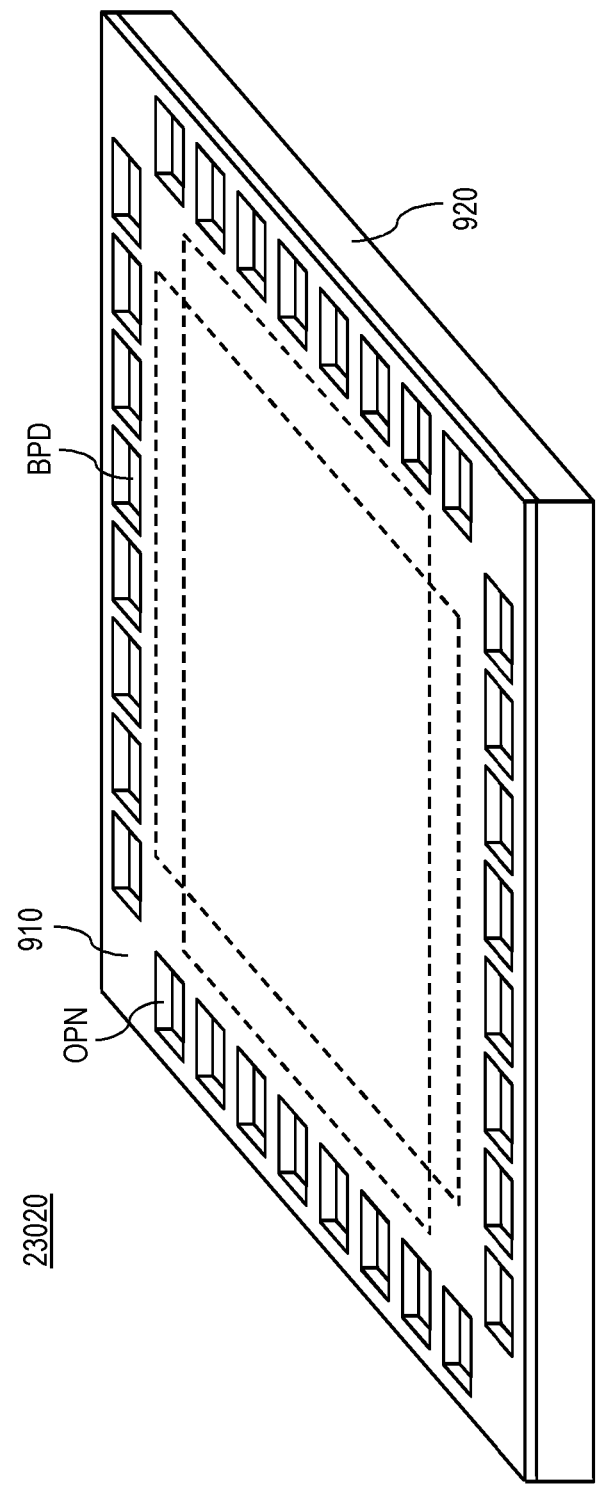
FIG. 8 is a diagram showing an example of a laminated structure of a solid-state imaging device according to an embodiment of the present disclosure.

FIG. 8 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include, in addition to the photoelectric conversion elements, at least the amplification transistor, the transfer transistor, the selection transistor, the reset transistor and, if applicable, the intervening transistor. The first chip 910 may or may not include the amplifier drain circuit.

The second chip 920 may be mainly a logic chip (digital chip) that includes the elements complementing the elements on the first chip 910 to complete pixel circuits. The second chip 920 may also include analog circuits, for example circuits that quantize analog signals transferred from the first chip 910 through the TCVs. For example, the second chip 920 may include the amplifier drain circuit.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 9:
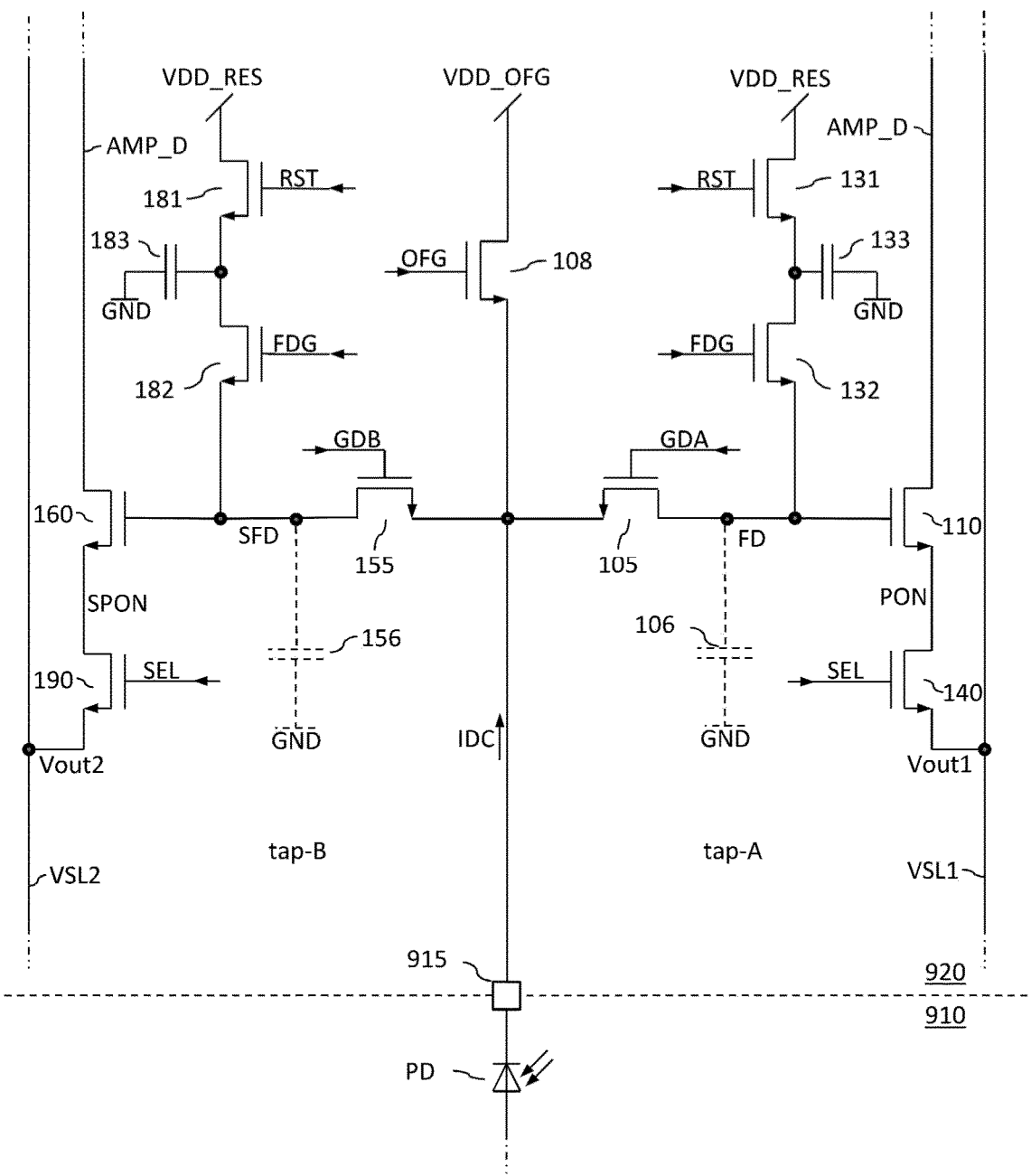
FIG. 9 is a simplified circuit diagram for illustrating a configuration example of an image sensor assembly according to an embodiment with two data signal lines per pixel column and with laminated structure.

FIG. 9 shows a possible allocation of elements of a pixel circuit 100 as illustrated in FIG. 7 across the first chip 910 and the second chip 920 of FIG. 8.

The first chip 910 may include the photoelectric conversion element PD. The second chip 920 may include the amplification transistors, the transfer transistors, the selection transistors, the reset transistors and the intervening transistors of both the tap-A part and the tap-B part.

Figure 10:
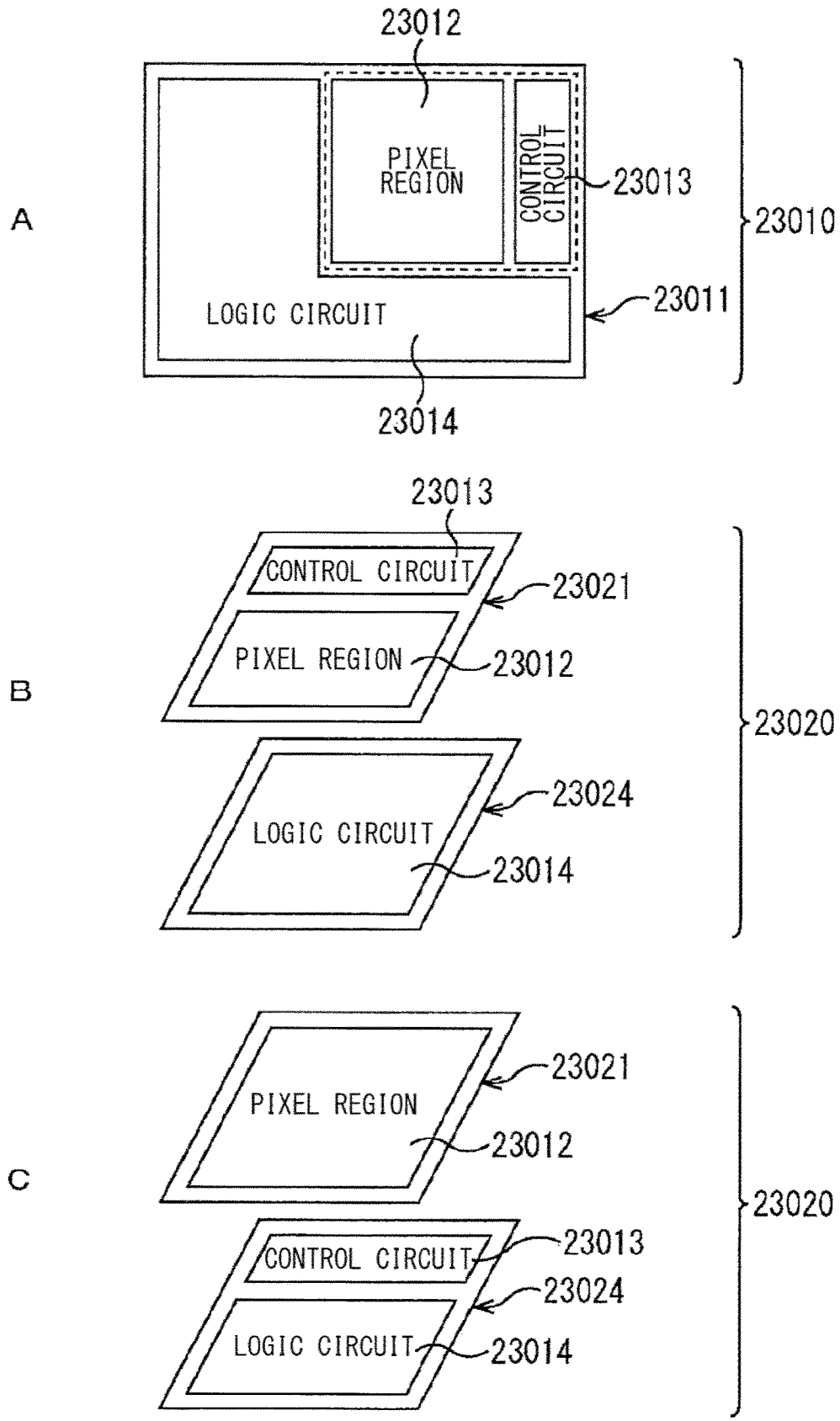
FIG. 10 illustrates an overview of a configuration example of a multi-layer solid-state imaging device to which a technology according to the present disclosure may be applied.

FIG. 10 illustrates schematic configuration examples of solid-state imaging devices 23010, 23020.

The single-layer solid-state imaging device 23010 illustrated in part A of FIG. 10 includes a single die (semiconductor substrate) 23011. Mounted and/or formed on the single die 23011 are a pixel region 23012 (photoelectric conversion elements), a control circuit 23013 (readout circuit, threshold controller), and a logic circuit 23014 (parts of pixel circuits, row driver). In the pixel region 23012, pixels are disposed in an array form. The control circuit 23013 performs various kinds of control including control of driving the pixels. The logic circuit 23014 performs signal processing.

Parts B and C of FIG. 10 illustrate schematic configuration examples of multi-layer solid-state imaging devices 23020 with laminated structure. As illustrated in parts B and C of FIG. 10, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 10, the pixel region 23012 and the control circuit 23013 are formed or mounted on the sensor die 23021, and the logic circuit 23014 is formed or mounted on the logic die 23024. The logic circuit 23014 may include at least parts of the pixel circuits as described with reference to the preceding FIGS. The pixel region 23012 includes at least the photoelectric conversion elements.

With reference to part C of FIG. 10, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Figure 11:
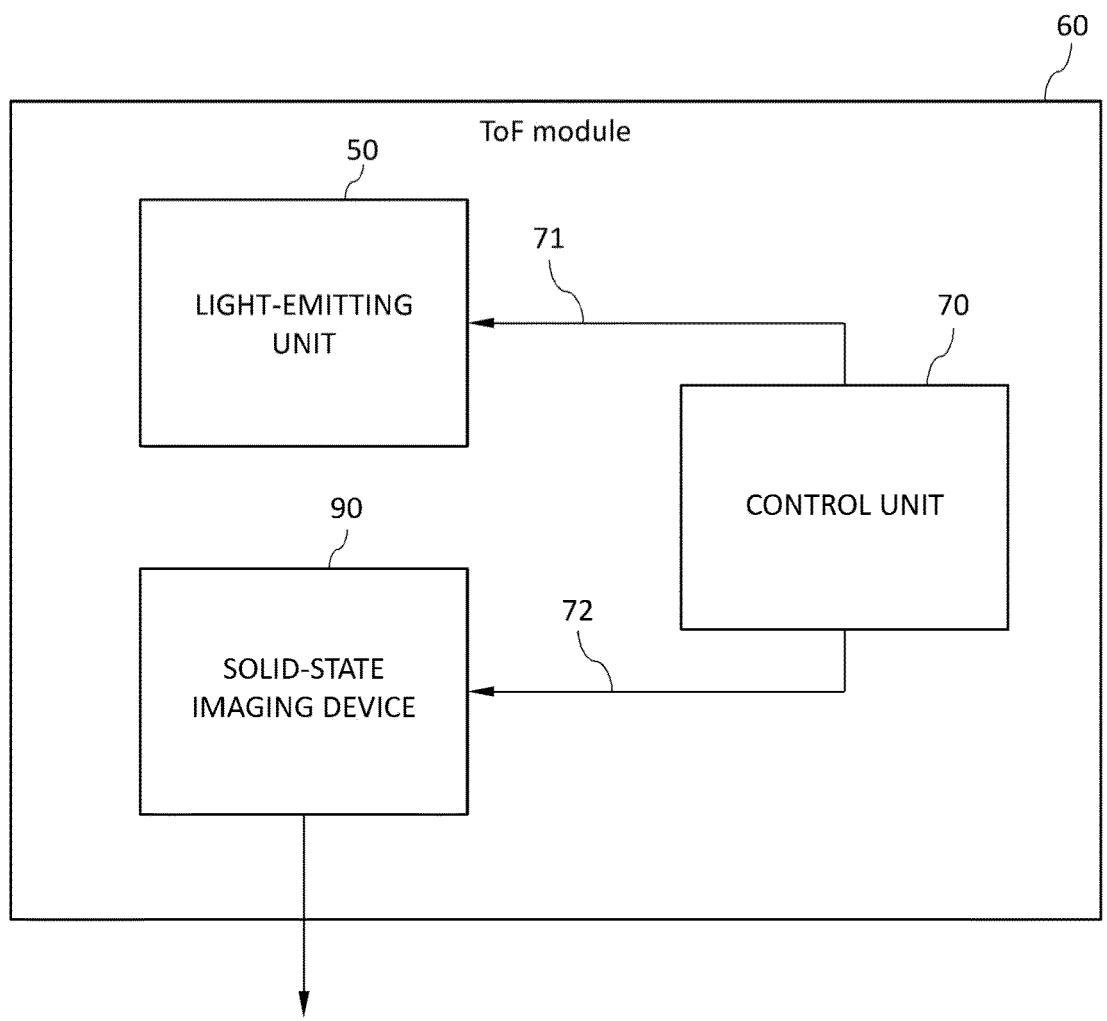
FIG. 11 is a block diagram depicting an example of a schematic configuration of a time-of-flight information acquisition system.

FIG. 11 is a block diagram illustrating a configuration example of a ToF (time-of-flight) module 60 according to this embodiment of the present technology. The ToF module 60 may be an electronic apparatus that measures a distance by a time of flight method, and includes a light-emitting unit 50, a control unit 70, and a solid-state imaging device 90 with pixel circuits as described in the preceding FIGS, in particular as described with reference to FIG. 7 and FIG. 9.

The light-emitting unit 50 intermittently emits irradiation light to irradiate an object with the irradiation light. For example, the light-emitting unit 50 generates irradiation light in synchronization with a light-emission control signal of a rectangular wave. In addition, the light-emitting unit 50 may include a photodiode, and near infrared light and the like can be used as the irradiation light. Furthermore, the light-emission control signal is not limited to the rectangular wave as long as the light-emission control signal is a periodic signal. For example, the light-emission control signal may be a sinusoidal wave. In addition, the irradiation light may be visible light and the like without limitation to near infrared light.

The control unit 70 controls the light-emitting unit 50 and the solid-state imaging device 90. The control unit 70 generates the light-emission control signal and may supply the light-emission control signal to the light-emitting unit 50 and the solid-state imaging device 90 through signal lines 71 and 72. For example, a frequency of the light-emission control signal may be 20 megahertz (MHz). Furthermore, the frequency of the light-emission control signal may be 5 megahertz (MHz) and the like without limitation to 20 megahertz (MHz).

The solid-state imaging device 90 receives reflected light of the intermittent irradiation light and measures a distance from an object by the ToF method. The solid-state imaging device 90 may generate distance measurement data indicating a measured distance and may output the distance measurement data to an outer side. With the solid-state imaging device 90 including pixel circuits as described with reference to the preceding figures, the ToF module combines high dynamic range and high noise performance.

Figure 12:
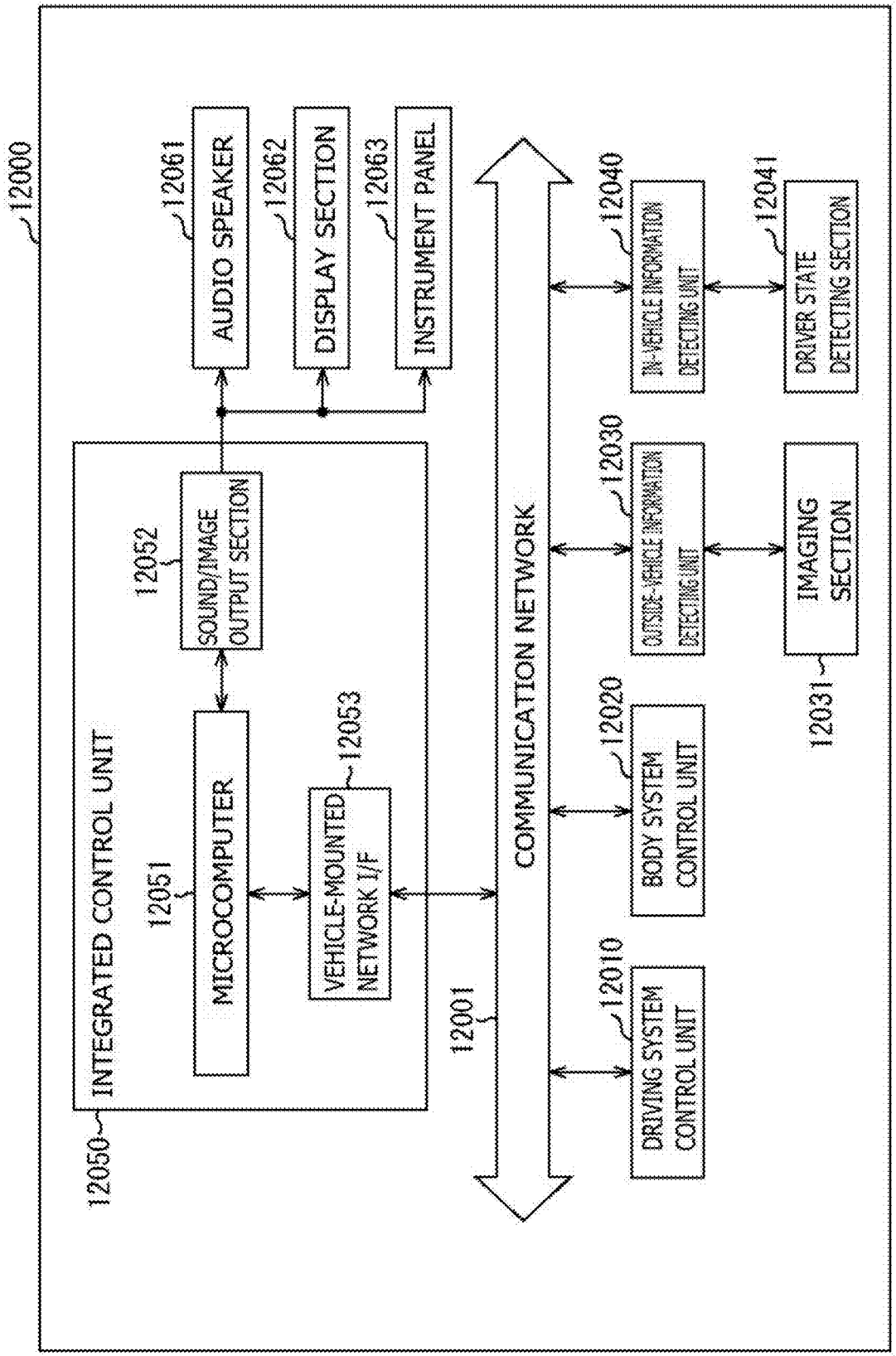
FIG. 12 is a block diagram depicting an example of a schematic configuration of a vehicle control system.

FIG. 12 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 12, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging device with pixel circuits according to the embodiments of the present disclosure. In particular, with the solid-state imaging device 10 including the pixel circuits as described with reference to the preceding figures, the imaging section 12031 combines high dynamic range and high noise performance. The light received by the imaging section 12031 may be visible light, or may be invisible light such as infrared rays or the like.

The in-vehicle information detecting unit 12040 detects information about the inside of the vehicle and may be or may include a solid-state imaging device and with pixel circuits according to the embodiments of the present disclosure. The in-vehicle information detecting unit 12040 is, for example, connected with a driver state detecting section 12041 that detects the state of a driver. The driver state detecting section 12041, for example, includes a camera that includes the solid-stage imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 12, an audio speaker 12061, a display section 12062, and an instrument panel 12063 are illustrated as the output device. The display section 12062 may, for example, include at least one of an on-board display or a head-up display.

Figure 13:
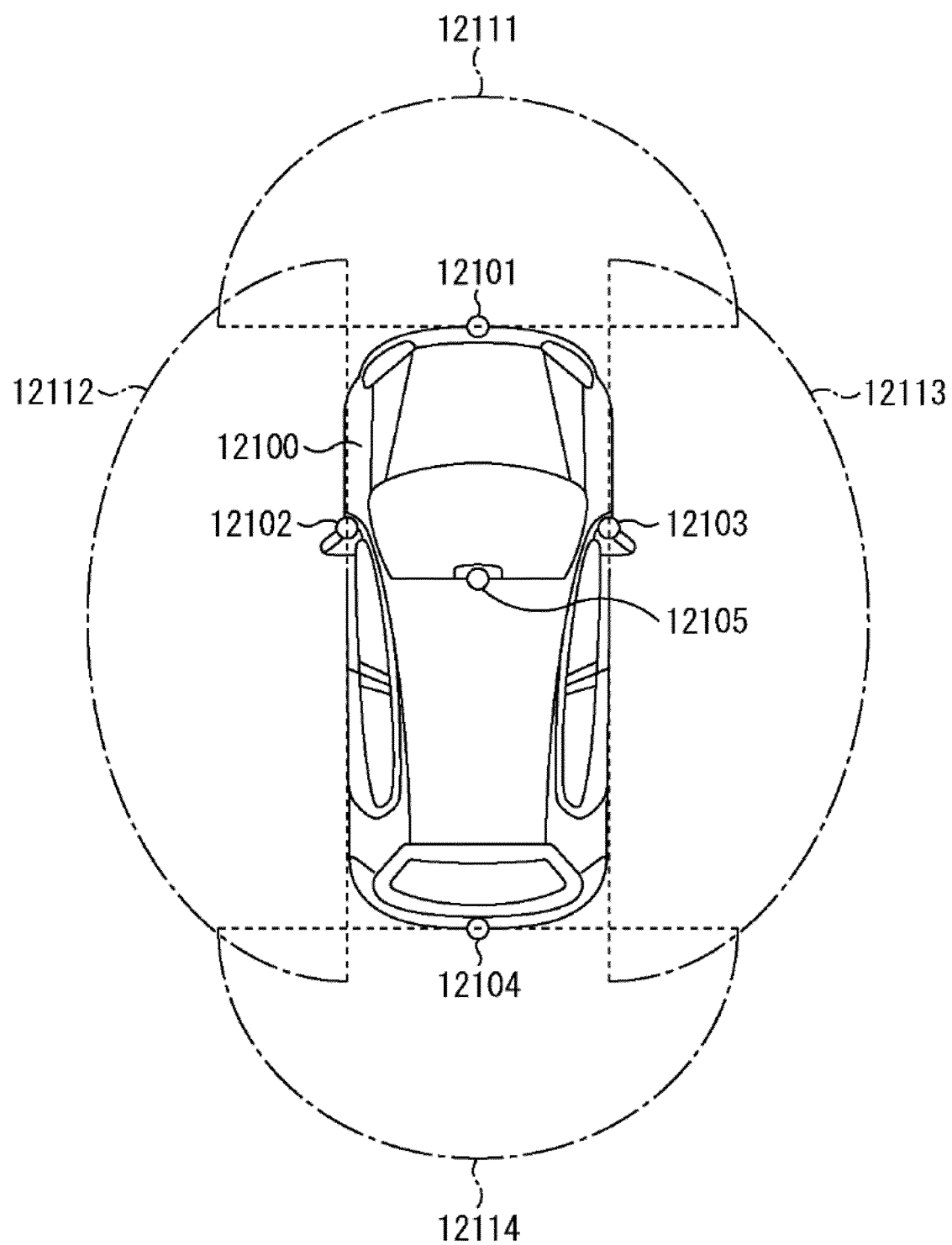
FIG. 13 is a diagram of assistance in explaining an example of installation positions of an outside-vehicle information detecting section and an imaging section of the vehicle control system of FIG. 12.

FIG. 13 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 13 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including a solid-state imaging device according to the present disclosure.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying the pixel circuits according to the embodiments the dynamic range of the sensors and the noise performance of the sensors can be enhanced.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) An image sensor assembly, comprising:
a pixel circuit comprising a charge storage structure and an amplification transistor with a load path between an amplifier drain line and a pixel output node, wherein the pixel circuit is configured such that a storage node of the charge storage structure controls the amplification transistor; and
an amplifier drain circuit configured to pass a low potential to the amplifier drain line in a reset period and a high potential in a readout period, wherein a transition from the low potential to the high potential is not before an end of the reset period and prior to a start of the readout period.

(2) The image sensor assembly according to (1),
wherein a capacitance of the charge storage structure is sufficiently low and the difference between the high potential and the low potential sufficiently high such that after the transition from the low potential to the high potential at the amplifier drain line the potential at the storage node is not lower than at the end of the reset period.

(3) The image sensor assembly according to any of (1) to (2),
wherein a capacitance of the charge storage structure is sufficiently high and the difference between the high potential and the low potential sufficiently low such that after transition of the amplifier drain line from the low potential to the high potential the amplification transistor is not operated in the linear region.

(4) The image sensor assembly according to any of (1) to (3),
wherein the pixel circuit further comprises a photoelectric conversion element configured to generate a detector current signal that discharges the charge storage structure.

(5) The image sensor assembly according to any of (1) to (4),
wherein the pixel circuit further comprises a reset circuit configured to pass a reset potential to the storage node for the reset period.

(6) The image sensor assembly according to (5),
wherein the reset circuit comprises a reset transistor with a load path connected to a reset potential and further comprises an intervening transistor with a load path connected in series between the load path of the reset transistor and the storage node, and wherein the pixel circuit is configured such that the transition from the low potential to the high potential on the amplifier drain line is not before the intervening transistor turns off.

(7) The image sensor assembly according to any of (1) to (6),
wherein the pixel circuit further comprises a selection transistor configured to pass a pixel output signal at the pixel output node to a data signal line for the readout period.

(8) The image sensor assembly according to (7),
wherein the selection transistor is configured to turn off prior to a transition from the high potential to the low potential on the amplifier drain line.

(9) The image sensor assembly according to any of (1) to (8),
wherein the amplifier drain circuit is controllable by a control signal.

(10) The image sensor assembly according to any of (1) to (9),
wherein a difference between the high potential and the low potential is at most 30% of the high potential.

(11) The image sensor assembly according to any of (1) to (10),
wherein the capacitance of the charge storage structure is at most 4fF.

(12) The image sensor assembly according to any of (1) to (11),
wherein the pixel circuit further comprises a supplemental charge storage structure and a supplemental amplification transistor with a load path between the amplifier drain line and a supplemental pixel output node, and wherein a potential at a supplemental storage node of the supplemental charge storage structure controls the supplemental amplification transistor.

(13) A solid-state imaging device, comprising:
a pixel array unit comprising a plurality of pixel circuits, wherein each pixel circuit comprises: a charge storage structure, an amplification transistor with a load path between an amplifier drain line and a pixel output node, wherein the pixel circuit is configured such that a potential at a storage node of the charge storage structure controls the amplification transistor, and a reset circuit configured to pass a reset potential to the storage node for the reset period, wherein the reset circuit comprises a reset transistor with a load path connected to a reset potential and further comprises an intervening transistor with a load path connected in series between the load path of the reset transistor and the storage node; and
an amplifier drain circuit configured to pass a low potential to the amplifier drain line in a reset period and a high potential in a readout period.

(14) The solid-state imaging device according to (13), further comprising:
a sensor controller configured to generate a control signal and to pass the control signal to the amplifier drain circuit, wherein the amplifier drain circuit is configured to control the potential on the amplifier drain line in response to the control signal such that a transition from the low potential to the high potential on the amplifier drain line is not before an end of the reset period and prior to a start of the readout period.

(15) A time-of-flight sensor assembly, comprising:
a pixel array unit comprising a plurality of pixel circuits, wherein each pixel circuit comprises: a charge storage structure, an amplification transistor with a load path between an amplifier drain line and a pixel output node, wherein the pixel circuit is configured such that a potential at a storage node of the charge storage structure controls the amplification transistor, a supplemental charge storage structure, and a supplemental amplification transistor with a load path between the amplifier drain line and a supplemental pixel output node, wherein the pixel circuit is configured such that a voltage across the supplemental charge storage structure controls the supplemental amplification transistor; and
an amplifier drain circuit configured to pass a low potential to the amplifier drain line in a reset period and a high potential in a readout period.

The invention claimed is:
1. An image sensor assembly, comprising:
a pixel circuit comprising a charge storage structure and an amplification transistor with a load path between an amplifier drain line and a pixel output node, wherein the pixel circuit is configured such that a storage node of the charge storage structure controls the amplification transistor; and
an amplifier drain circuit configured to pass a low potential to the amplifier drain line in a reset period and a high potential in a readout period, wherein a transition from the low potential to the high potential is not before an end of the reset period and prior to a start of the readout period,
wherein the amplifier drain circuit effects a voltage boost at the storage node, the voltage boost being caused by the transition.

2. The image sensor assembly according to claim 1,
wherein a capacitance of the charge storage structure is sufficiently low and the difference between the high potential and the low potential sufficiently high such that after the transition from the low potential to the high potential at the amplifier drain line the potential at the storage node is not lower than at the end of the reset period.

3. The image sensor assembly according to claim 1,
wherein a capacitance of the charge storage structure is sufficiently high and the difference between the high potential and the low potential sufficiently low such that after transition of the amplifier drain line from the low potential to the high potential the amplification transistor is not operated in the linear region.

4. The image sensor assembly according to claim 1,
wherein the pixel circuit further comprises a photoelectric conversion element configured to generate a detector current signal that discharges the charge storage structure.

5. The image sensor assembly according to claim 1,
wherein the pixel circuit further comprises a reset circuit configured to pass a reset potential to the storage node for the reset period.

6. The image sensor assembly according to claim 5,
wherein the reset circuit comprises a reset transistor with a load path connected to a reset potential and further comprises an intervening transistor with a load path connected in series between the load path of the reset transistor and the storage node, and wherein the pixel circuit is configured such that the transition from the low potential to the high potential on the amplifier drain line is not before the intervening transistor turns off.

7. The image sensor assembly according to claim 1,
wherein the pixel circuit further comprises a selection transistor configured to pass a pixel output signal at the pixel output node to a data signal line for the readout period.

8. The image sensor assembly according to claim 7,
wherein the selection transistor is configured to turn off prior to a transition from the high potential to the low potential on the amplifier drain line.

9. The image sensor assembly according to claim 1,
wherein the amplifier drain circuit is controllable by a control signal.

10. The image sensor assembly according to claim 1,
wherein a difference between the high potential and the low potential is at most 30% of the high potential.

11. The image sensor assembly according to claim 1,
wherein the capacitance of the charge storage structure is at most 4fF.

12. The image sensor assembly according to claim 1,
wherein the pixel circuit further comprises a supplemental charge storage structure and a supplemental amplification transistor with a load path between the amplifier drain line and a supplemental pixel output node, and wherein a potential at a supplemental storage node of the supplemental charge storage structure controls the supplemental amplification transistor.

13. The image sensor assembly according to claim 1,
wherein, after the transition from the low potential to the high potential at the amplifier drain line, the potential at the storage node is configured to be higher than a reset voltage at the end of the reset period.

14. The image sensor assembly according to claim 1,
wherein the pixel circuit of the image sensor assembly is among a plurality of pixel circuits, the plurality of pixel circuits include a plurality of pixel rows, each pixel row among the plurality of pixel rows sharing one amplifier drain circuit among a plurality of amplifier drain circuits comprising the amplifier drain circuit of the pixel circuit among the plurality of pixel circuits, such that a reset during the reset period is rolling and active for one pixel row at a time among the plurality of pixel rows.

15. A solid-state imaging device, comprising:
a pixel array unit comprising a plurality of pixel circuits, wherein each pixel circuit comprises:
a charge storage structure,
an amplification transistor with a load path between an amplifier drain line and a pixel output node, wherein the pixel circuit is configured such that a potential at a storage node of the charge storage structure controls the amplification transistor, and
a reset circuit configured to pass a reset potential to the storage node for the reset period, wherein the reset circuit comprises a reset transistor with a load path connected to a reset potential and further comprises an intervening transistor with a load path connected in series between the load path of the reset transistor and the storage node;
an amplifier drain circuit configured to pass a low potential to the amplifier drain line in a reset period and a high potential in a readout period; and
a sensor controller configured to generate a control signal and to pass the control signal to the amplifier drain circuit, wherein the amplifier drain circuit is configured to control the potential on the amplifier drain line in response to the control signal such that a transition from the low potential to the high potential on the amplifier drain line is not before an end of the reset period and prior to a start of the readout period,
wherein the amplifier drain circuit effects a voltage boost at the storage node, the voltage boost being caused by the transition.

16. The solid-state imaging device according to claim 15,
wherein, after the transition from the low potential to the high potential at the amplifier drain line, the potential at the storage node is configured to be higher than a reset voltage at the end of the reset period.

17. The solid-state imaging device according to claim 15,
wherein the plurality of pixel circuits include a plurality of pixel rows, each pixel row among the plurality of pixel rows sharing one amplifier drain circuit among a plurality of amplifier drain circuits comprising the amplifier drain circuit of the each pixel circuit among the plurality of pixel circuits, such that a reset during the reset period is rolling and active for one pixel row at a time among the plurality of pixel rows.

18. A time-of-flight sensor assembly, comprising:
a pixel array unit comprising a plurality of pixel circuits, wherein each pixel circuit comprises:
a charge storage structure,
an amplification transistor with a load path between an amplifier drain line and a pixel output node, wherein the pixel circuit is configured such that a potential at a storage node of the charge storage structure controls the amplification transistor,
a supplemental charge storage structure, and
a supplemental amplification transistor with a load path between the amplifier drain line and a supplemental pixel output node, wherein the pixel circuit is configured such that a voltage across the supplemental charge storage structure controls the supplemental amplification transistor;
an amplifier drain circuit configured to pass a low potential to the amplifier drain line in a reset period and a high potential in a readout period; and
a sensor controller configured to generate a control signal and to pass the control signal to the amplifier drain circuit, wherein the amplifier drain circuit is configured to control the potential on the amplifier drain line in response to the control signal such that a transition from the low potential to the high potential on the amplifier drain line is not before an end of the reset period and prior to a start of the readout period,
wherein the amplifier drain circuit effects a voltage boost at the storage node, the voltage boost being caused by the transition.

19. The time-of-flight sensor assembly according to claim 18,
wherein, after the transition from the low potential to the high potential at the amplifier drain line, the potential at the storage node is configured to be higher than a reset voltage at the end of the reset period.

20. The time-of-flight sensor assembly according to claim 18,
wherein the plurality of pixel circuits include a plurality of pixel rows, each pixel row among the plurality of pixel rows sharing one amplifier drain circuit among a plurality of amplifier drain circuits comprising the amplifier drain circuit of the each pixel circuit among the plurality of pixel circuits, such that a reset during the reset period is rolling and active for one pixel row at a time among the plurality of pixel rows.

* * * * *